(12) United States Patent
Nichols et al.

(10) Patent No.: US 8,142,697 B2
(45) Date of Patent: *Mar. 27, 2012

(54) LOW DENSITY ORIENTED POLYMER COMPOSITION WITH INERT INORGANIC FILLER

(76) Inventors: Kevin L. Nichols, Freeland, MI (US); Brett M. Birchmeier, Midland, MI (US); Ian M. Ward, Leeds (GB); Philip D. Coates, Leeds (GB); Phil Caton-Rose, Bradford (GB); Glen P. Thompson, Bradford (GB); Vijay Wani, Lake Jackson, TX (US); Rajen M. Patel, Lake Jackson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/821,292

(22) Filed: Jun. 23, 2010

(65) Prior Publication Data

US 2010/0301511 A1   Dec. 2, 2010

Related U.S. Application Data

(62) Division of application No. 12/113,265, filed on May 1, 2008.

(60) Provisional application No. 60/930,145, filed on May 14, 2007.

(51) Int. Cl.
*B29C 43/22* (2006.01)

(52) U.S. Cl. ............... 264/45.8; 264/177.2; 264/211.12; 264/292

(58) Field of Classification Search ................. 264/45.8, 264/177.2, 211.12, 292
See application file for complete search history.

(56) References Cited

U.S. PATENT DOCUMENTS

| | | | |
|---|---|---|---|
| 4,111,860 A | 9/1978 | Jack | |
| 4,282,277 A | 8/1981 | Austen et al. | |
| 4,350,655 A | 9/1982 | Hoge | |
| 5,169,587 A * | 12/1992 | Courval | 264/323 |
| 5,169,589 A * | 12/1992 | Francoeur et al. | 264/323 |
| 5,204,045 A * | 4/1993 | Courval et al. | 264/323 |
| 5,474,722 A | 12/1995 | Woodhams | |
| 6,939,496 B2 | 9/2005 | Maine et al. | |
| 2002/0059706 A1 | 5/2002 | Nomura et al. | |
| 2004/0001940 A1 | 1/2004 | Neogi et al. | |
| 2005/0070673 A1 | 3/2005 | Novak et al. | |
| 2005/0171246 A1 * | 8/2005 | Maine et al. | 524/13 |
| 2005/0192382 A1 | 9/2005 | Maine et al. | |
| 2006/0057348 A1 * | 3/2006 | Maine et al. | 428/221 |
| 2007/0078191 A1 | 4/2007 | Guhde et al. | |
| 2008/0111277 A1 | 5/2008 | Nichols et al. | |
| 2008/0111278 A1 | 5/2008 | Nichols et al. | |

FOREIGN PATENT DOCUMENTS

| | | |
|---|---|---|
| EP | 1242220 | 5/2004 |
| GB | 1311885 | 3/1973 |
| WO | 2004009334 | 1/2004 |

OTHER PUBLICATIONS

Newson, et al; "Oriented Polypropylene Composites Made with Mica", handout from 8th International Conference on Woodfiber-Plastic Composites, May 23-25; Madison, WI, USA, Oct. 29, 2005.
Newson et al.; "Plastic Reactive Fillers/Thermoplastic Composites", handout from 8th International Conference on Woodfiber-Plastic Composites, May 23-25, Madison, WI, USA, Oct. 29, 2005.
Newson et al.; "Oriented Polypropylene Composites Made with Calcium Cabonates", handout from 8th International Conference on Woodfiber-Plastic Composites, May 23-25, Madison, WI, USA, Oct. 29, 2005.
Pawlak et al.; "Plastic Deformation of Crystalline Polymers: The Role of Cavitation and Crystal Plasticity", Macromolecules, 2005, 9688-9697, vol. 38.
International Code Council—Evaluation Services Requirement AC174: "Acceptable Criteria for Deck Board Ratings and Guardrail Systems.", Feb. 2007.
Hope, et al.; The Hydrostatic Extrusion and Die-Drawings of Glass-Fiber-Reinforced Polysoxmetheylene, Polymer Engineering and Science, 22 (5), 307-313 (1982).
Ward, et al; "Solid Phase Processing of Polymers"; Hanser Gardner Publications, Inc. (2000).

* cited by examiner

*Primary Examiner* — Peter Szekely
(74) *Attorney, Agent, or Firm* — Robert L. Stearns; Dickinson Wright PLLC

(57) ABSTRACT

An oriented polymer composition containing thirty to 95 weight-percent inert inorganic filler and a continuous phase of at least one orientable polymer contains void spaces due to cavitation and has a density of less than 0.8 grams per cubic centimeter, a flexural modulus of 1.4 gigapascals or more, cross section dimensions all greater than 1.5 millimeters, a delamination force value of 44.5 Newtons (ten pounds force) or more and little or no blowing agent.

13 Claims, No Drawings

LOW DENSITY ORIENTED POLYMER COMPOSITION WITH INERT INORGANIC FILLER

CROSS REFERENCE STATEMENT

This application is a Divisional of U.S. application Ser. No. 12/113,265, filed May 1, 2008, which claims benefit of U.S. Provisional Application No. 60/930,145, filed on May 14, 2007, the entire content of which is incorporated herein by reference.

BACKGROUND OF THE INVENTION

1. Field of the Invention

The present invention relates to solid state drawing processes and oriented polymer compositions produced by solid state drawing processes.

2. Description of Related Art

Oriented polymer compositions are desirable for having higher strength and stiffness over non-oriented polymer compositions. Historically, polymeric films and fibers have enjoyed the benefits of orientation through drawing processes. However, when a polymer cross section becomes larger than that of a film or fiber, drawing to a controlled and consistent shape becomes more complex and new drawing processes are necessary.

Great Britain (GB) patent 1311885 discloses a solid state die drawing process to address the challenges of orienting larger cross section polymer compositions, which the patent identifies as compositions having a cross-sectional area of 0.01 square inches (6.45 square millimeters) or more or with all cross sectional dimensions greater than 0.05 inches (1.27 millimeters). The solid state die drawing process requires drawing a polymer composition billet through a lubricated drawing die in the polymer composition's solid phase at a temperature below the polymer composition's melting temperature ($T_m$). The drawing die forces the polymer composition to converge towards a specific shape, causing alignment of polymer chains. According to GB1311885, one of the challenges with large cross section billets is bringing the entire cross section to a uniform temperature prior to drawing in order to allow control of the extrusion velocity of the billet into the drawing die. Small cross section articles such as films and fibers do not present such a challenge.

Orientation of filled polymer compositions is of particular interest. Filler offers numerous benefits, perhaps the most recognized is reduction in raw material cost for the polymer composition. Use of wood fiber fillers in oriented polymer compositions has been of particular interest for fabricating oriented polymer compositions that serve as an alternative to wood decking materials (that is, composite decking). Organic fillers, however, are subject to handicaps including color bleaching when exposed to the sun, and to decomposition, mold and mildew when exposed to humidity even within a polymer composition. Inorganic fillers are attractive because they are not subject to these handicaps. However, inorganic fillers tend to have a higher density than organic fillers. Additionally, reactive inorganic fillers such as Portland cement and gypsum are reactive with water (see, for example, PCT publication WO 2004/009334), which can result in an unstable polymer composition density in humid environments.

Incorporating void volume in a filled oriented polymer composition reduces the composition's density. U.S. Pat. No. 5,474,722 ('722) discloses use of blowing agents with organic and mica fillers (see Examples 3 and 9 in '722) in order to reduce the density of an oriented polymer composition. Blowing agents expand to foam the polymer composition in order to establish void volume. Foamed compositions contain blowing agent. Foaming requires a foaming step and control of foaming agent in the process.

Cavitation is a desirable alternative for reducing an oriented polymer composition density without the use of a blowing agent. Cavitation induces void volume proximate to filler particles while drawing a polymer composition containing the filler particles. For example, European Patent 1242220B1 provides an example a polypropylene composition filled with wood filler (composition density of about one gram per cubic centimeter ($g/cm^3$)) that is drawn at a drawing rate of 48 inches (122 centimeters) per minute to obtain an oriented polymer composition having a density of 0.59 $g/cm^3$ centimeter. Drawing compositions containing up to 22 weight-percent of mica filler in polypropylene also reveal void volumes from cavitation of up to 28.5% and densities down to 0.76 $g/cm^3$. (W. R. Newson and F. R. Maine, ORIENTED POLYPROPYLENE COMPOSITIONS MADE WITH MICA, handout from 8th International Conference on Wood-fiber-Plastic Composites, Madison, Wis., May 23-25, 2005).

PCT publication WO 2004/009334 ('334) discloses cavitation during orientation of polymer filled with reactive inorganic fillers such as Portland cement. '334 discloses both die drawn and free draw processes. The lowest density '334 reveals for a die drawn oriented polymer composition is 0.82 $g/cm^3$. Lower densities are reported for free drawn compositions by using a linear draw ratio of greater than eleven. However, free drawn oriented compositions having such a large linear draw ratio (greater than eleven) tend to suffer from a low delamination force. That is, they delaminate or fibrillate more easily along the drawing direction than free drawn compositions having a lower linear draw ratio, as well as die drawn compositions. Moreover, a free draw process offers little control over the dimension of a final drawn article as compared to die drawn processes.

Using filler in an oriented polymer composition is desirable both to reduce the cost of a polymer composition and also to promote cavitation. Both of these features are attractive for preparing oriented polymer compositions that can serve as alternatives to wood in structural applications such as composite decking where cost and weight are both important. Desirably, oriented polymer compositions in such structural applications are free of handicaps associated with organic fillers, density and composition instability in the presence of humidity that reactive inorganic fillers are subject to, high densities associated with inorganic filler and a low delamination force with high linear draw ratios.

An oriented polymer composition containing a large amount (thirty weight-percent or more based on polymer composition weight) of inert inorganic filler that has a density comparable to or less than wood (that is, less than 0.8 $g/cm^3$) and strength and stiffness sufficient to meet building codes for use in structural applications is desirable. It is further of interest to have such an oriented polymer composition that is essentially free or completely free of blowing agent. It is still further desirable for such an oriented polymer composition to have a delamination force of at least 44.5 Newtons (ten pounds force) to resist delamination and fibrillation during use.

Measure the density of a polymer composition according to American Society for Testing and Materials (ASTM) method D-792-00.

BRIEF SUMMARY OF THE INVENTION

Experimentation leading to the present invention surprisingly revealed that solid state drawing a polymer composition containing thirty weight-percent or more (based on polymer composition weight) of inert inorganic filler can result in cavitation within the polymer composition sufficient to achieve an oriented polymer composition having a density comparable to or less than wood (that is, less than 0.8 grams per cubic centimeter) and a modulus sufficient to meet building codes without requiring a blowing agent or a linear draw ratio of eleven. As a result, articles of the present invention surprisingly enjoy combined benefits of high concentrations of filler (30 wt % or more by weight of polymer), low density (less than 0.8 g/cm$^3$), high flexural modulus (1.4 gigapascals or more) and high delamination force values (44.5 Newtons (N) or more; 10 pounds force or more) typically absent from compositions having a linear draw ratio greater than eleven while also being virtually, even completely free of blowing agent.

In a first aspect, the present invention is an oriented polymer composition comprising thirty weight-percent or more and 95 weight-percent or less inert inorganic filler based on oriented polymer composition weight and a continuous phase of at least one orientable polymer, wherein the oriented polymer composition has: (a) a density of less than 0.8 grams per cubic centimeter according to American Society for Testing and Materials (ASTM) method 792-00; (b) a flexural modulus of 1.4 gigapascals (200,000 pounds per square inch) or more according to ASTM method D-790-03; (c) cross section dimensions all greater than 1.5 millimeters; (d) a delamination force value greater than 44.5 Newtons (ten pounds force); and wherein the oriented polymer composition contains less than three weight-percent blowing agent based on oriented polymer composition weight.

Preferred embodiments of the first aspect include any one or combination of more than one of the following characteristics: the filler is selected from a group consisting of talc (including any individual or combination of materials and grades of materials commonly known as or available as "talc"), calcium carbonate, clay and fly ash; the orientable polymer is a polyolefin; and the orientable polymer is selected from polypropylene-based polymers, polyethylene-based polymers and polyvinyl chloride; the oriented polymer composition is free of blowing agent.

In a second aspect, the present invention is a process for solid state drawing a polymer composition comprising: (a) providing a polymer composition comprising thirty weight-percent or more and 95 weight-percent or less of an inert inorganic filler based on polymer composition weight and a continuous phase of at least one orientable polymer, the polymer composition having a softening temperature; (b) conditioning the temperature of the polymer composition to a drawing temperature that is ten degrees Celsius or more below the polymer composition's softening temperature; (c) drawing the polymer composition though a drawing die at a drawing rate of at least 0.25 meters per minute to achieve a linear draw ratio of ten or less; and (d) optionally cooling the polymer composition after exiting the drawing die; wherein the polymer composition comprises less than three weight-percent blowing agent based on polymer composition weight.

Preferred embodiments of the second aspect include any one or combination of more than one of the following characteristics: the orientable polymer is a polyolefin; the orientable polymer is selected from polypropylene-based polymers, polyethylene-based polymers and polyvinyl chloride; the draw rate is 0.5 meters per minute or faster; the draw rate is one meter per minute or faster; the drawing temperature is at least fifteen degrees Celsius below the polymer composition's softening temperature; the drawing temperature is at least twenty degrees Celsius below the polymer composition's softening temperature; the draw temperature is forty degrees Celsius or less below the polymer composition's softening temperature; the filler is selected from talc, calcium carbonate and fly ash; the filler is present at a concentration of 40 percent by weight or more relative to polymer composition weight before drawing; the polymer composition experiences a nominal draw ratio of 1.25 or more and less than five; drawing is done through a drawing die that induces proportional drawing of the polymer composition; and the polymer composition is free of blowing agent.

DETAILED DESCRIPTION OF THE INVENTION

Terms

"Solid state" refers to a polymer (or polymer composition) that is below the softening temperature of the polymer (or polymer composition). Hence, "solid state drawing" refers to drawing a polymer or polymer composition that is below the softening temperature of the polymer (or polymer composition).

"Polymer composition" comprises at least one polymer component and can contain non-polymeric components.

"Softening temperature" ($T_s$) for a polymer or polymer composition having as polymer components only one or more than one semi-crystalline polymer is the melting temperature for the polymer composition.

"Melting temperature" ($T_m$) for a semi-crystalline polymer is the temperature half-way through a crystalline-to-melt phase change as determined by differential scanning calorimetry (DSC) upon heating a crystallized polymer at a specific heating rate. Determine $T_m$ for a semi-crystalline polymer according to the DSC procedure in ASTM method E794-06. Determine $T_m$ for a combination of polymers and for a filled polymer composition also by DSC under the same test conditions in ASTM method E794-06. If the combination of polymers or filled polymer composition only contains miscible polymers and only one crystalline-to-melt phase change is evident in the a DSC curve, then $T_m$ for the polymer combination or filled polymer composition is the temperature half-way through the phase change. If multiple crystalline-to-melt phase changes are evident in a DSC curve due to the presence of immiscible polymers, then $T_m$ for the polymer combination or filled polymer composition is the $T_m$ of the continuous phase polymer. If more than one polymer is continuous and they are not miscible, then the $T_m$ for the polymer combination or filled polymer composition is the highest $T_m$ of the continuous phase polymers.

"Softening temperature" ($T_s$) for a polymer or polymer composition having as polymer components only one or more than one amorphous polymer is the glass transition temperature for the polymer composition.

"Glass transition temperature" ($T_g$) for a polymer or polymer composition is the temperature half-way through a glass transition phase change as determined by DSC according to the procedure in ASTM method D3418-03. Determine $T_g$ for a combination of polymers and for a filled polymer composition also by DSC under the same test conditions in D3418-03. If the combination of polymer or filled polymer composition only contains miscible polymers and only one glass transition phase change is evident in the DSC curve, then $T_g$ of the polymer combination or filled polymer composition is the temperature half-way through the phase change. If multiple glass transition phase changes are evident in a DSC curve due to the presence of immiscible amorphous polymers, then $T_g$ for the polymer combination or filled polymer composition is the $T_g$ of the continuous phase polymer. If more than one amorphous polymer is continuous and they are not miscible, then the $T_g$ for the polymer composition or filled polymer composition is the highest $T_g$ of the continuous phase polymers.

If the polymer composition contains a combination of semi-crystalline and amorphous polymers, the softening temperature of the polymer composition is the softening temperature of the continuous phase polymer or polymer composition.

"Drawing axis" for a die is a straight line extending in the direction that the center of mass (centroid) of a polymer composition is moving as the polymer composition is drawn.

"Cross sections" herein are perpendicular to the drawing axis unless the reference to the cross section indicates otherwise. A cross section has a centroid and has a perimeter that defines a shape for the cross section.

A "cross section dimension" is the length of a straight line connecting two points on a cross section's perimeter and extending through the centroid of the cross section. For example, a cross section dimension of a rectilinear four-sided polymer composition could be the height or width of the polymer composition.

An artisan understands that a polymer composition typically has a variation in temperature through its cross section (that is, along a cross sectional dimension of the composition) during processing. Therefore, reference to temperature of a polymer composition refers to an average of the highest and lowest temperature along a cross sectional dimension of the polymer composition. The temperature at two different points along the polymer cross sectional dimension desirably differs by 10% or less, preferably 5% or less, more preferably 1% or less, most preferably by 0% from the average temperature of the highest and lowest temperature along the cross sectional dimension. Measure the temperature in degrees Celsius (° C.) along a cross sectional dimension by inserting thermocouples to different points along the cross sectional dimension.

"Drawing temperature" refers to the temperature of the polymer composition as it begins to undergo drawing in a solid state drawing die.

"Linear Draw Ratio" is a measure of how much a polymer composition elongates in a drawing direction (direction the composition is drawn) during a drawing process. Determine linear draw ratio while processing by marking two points on a polymer composition spaced apart by a pre-orientated composition spacing. Measure how far apart those two points are after drawing to get an oriented composition spacing. The ratio of final spacing to initial spacing identifies the linear draw ratio.

"Nominal draw ratio" is the cross sectional surface area of a polymer composition prior as it enters a drawing die divided by the polymer cross sectional area as it exits the drawing die.

"Delamination Force" is a measure of the force needed to delaminate a portion of a polymer composition along the composition's extrusion direction. Measure delamination force for a polymer composition by means of a delamination test as applied to a "test sample" taken from the polymer composition.

A "test sample" is a portion of polymer composition taken from the center of a polymer composition (that is, the centroid of any cross section of the test sample corresponds to a centroid of a cross section of the polymer composition containing the cross section of the test sample). The test sample has a length (drawing dimension orientation) of 2 centimeters (cm) to 10 cm, width (dimension perpendicular to length) in a range of 8 mm to 12 mm, and uniform thickness (dimension mutually perpendicular to length and width) in a range of 1.25 mm to 4 mm. Use a sharp razor to slice as narrow of a notch as possible in a plane containing the length and thickness dimensions, centered in the width dimension and extending to a notch length that is 5 to 12 mm in the length dimension of the sample. The two tabs on either side of the notch that extend in the length dimension and that have equal widths of oriented polymer composition on either side of the notch.

Conduct the delamination test after conditioning the test sample to 23° C. and 50% relative humidity by pulling the tabs apart at a rate of 0.2 inches per minute in the width dimension of the test sample (perpendicular to the plane of the notch). Grip each tab proximate to an end of the test sample such that the distance from the center of the grip to the end of the notch interior to the test sample defines a notch length. Measure the force applied to the tabs until the tabs disconnect from one another into distinct pieces. The maximum force measured prior to disconnecting the tabs is the "peak force". Determine the Delamination Force (DF) for the test sample according to the following equation:

$$DF=(\text{Peak Force})(\text{notch length})/(\text{Test Sample Thickness})$$

The more force that is required to completely delaminate the tabs, the greater the delamination force value and structural integrity for the polymer composition.

Measure the density of a polymer composition according to American Society for Testing and Materials (ASTM) method D-792-00.

Oriented Polymer Composition

The present invention, in one aspect, is an oriented polymer composition. An oriented polymer composition comprises polymer molecules that have a higher degree of molecular orientation than that of a polymer composition extruded from a mixer. Typically, an oriented polymer composition requires a specific processing step designed for the purpose of orienting the polymer composition (for example, solid state drawing or ram extruding through a converging die) in order to convert a polymer composition to an oriented polymer composition.

The oriented polymer composition of the present invention comprises a continuous phase of one or more orientable polymers. Typically, 90 weight-percent (wt %) or more, more typically, 95 wt % or more of the polymers in the polymer composition are orientable polymers. All of the polymer in the polymer composition can be orientable. Measure wt % based on total polymer weight in the oriented polymer composition. All of the polymers in the oriented polymer composition can be orientable polymers.

An orientable polymer is a polymer that can undergo polymer alignment. Orientable polymers can be amorphous or semi-crystalline. Herein, "semi-crystalline" and "crystalline" polymers interchangeably refer to polymers having a melt temperature ($T_m$). Desirable orientable polymers are one or more than one semi-crystalline polymer, particularly polyolefin polymers (polyolefins). Polyolefins tend to readily undergo cavitation in combination with filler particles presumably because polyolefins are relatively non-polar and as such adhere less readily to filler particles. Linear polymers (that is, polymers in which chain branching occurs in less than 1 of 1,000 monomer units such as linear low density polyethylene) are even more desirable.

Suitable orientable polymers include polymers and copolymers based on polystyrene, polycarbonate, polypropylene, polyethylene (for example, high density, very high density and ultra high density polyethylene), polyvinyl chloride, polymethylpentane, polytetrafluoroethylene, polyamides, polyesters (for example, polyethylene terephthalate) and polyester-based polymers, polycarbonates, polyethylene oxide, polyoxymethylene, polyvinylidine fluoride and liquid crystal polymers and combinations thereof. A first polymer is "based on" a second polymer if the first polymer comprises the second polymer. For example, a block copolymer is based on the polymers comprising the blocks. Particularly desirably orientable polymers include polymers based on polyethylene, polypropylene, and polyesters. More particularly desirable orientable polymers include linear polyethylene having a Mw from 50,000 to 3,000,000 g/mol; especially from 100,000 to 1,500,000 g/mol, even from 750,000 to 1,500,000 g/mol.

A preferred class of polyesters (and polyester-based polymers) is those which are derivable from the reaction of at least one polyhydric alcohol, suitably a linear polyhydric alcohol, preferably a diol such as linear $C_2$ to $C_6$ diol with at least one polybasic acid, suitably a polycarboxylic acid. Examples of suitable polyesters include polyethylene 2,6-naphthalate, polyethylene 1,5-naphthalate, polytetramethylene 1,2-dihydroxybenzoate, polyethylene terephthalate, polybutylene terephthalate and copolyesters, especially of ethylene terephthalate.

Polypropylene (PP)-based polymers (that is, polymers based on PP) are one example of desirable orientable polymers for use in the present invention. PP-based polymers generally have a lower density than other orientable polyolefin polymers. Therefore, PP-based polymers facilitate lighter articles than other orientable polyolefin polymers. PP-based polymers also offer greater thermal stability than other orientable polyolefin polymers. Therefore, PP-based polymers may also form oriented articles having higher thermal stability than oriented articles of other polyolefin polymers.

Suitable PP-based polymers include Zeigler Natta, metallocene and post-metallocene prolypropylenes. Suitable PP-based polymers include PP homopolymer; PP random copolymer (with ethylene or other alpha-olefin present from 0.1 to 15 percent by weight of monomers); PP impact copolymers with either PP homopolymer or PP random copolymer matrix of 50 to 97 percent by weight (wt %) based on impact copolymer weight and with ethylene propylene copolymer rubber present at 3 to 50 wt % based on impact copolymer weight prepared in-reactor or an impact modifier or random copolymer rubber prepared by copolymerization of two or more alpha olefins prepared in-reactor; PP impact copolymer with either a PP homopolymer or PP random copolymer matrix for 50 to 97 wt % of the impact copolymer weight and with ethylene-propylene copolymer rubber present at 3 to 50 wt % of the impact copolymer weight added via compounding, or other rubber (impact modifier) prepared by copolymerization of two or more alpha olefins (such as ethylene-octene) by Zeigler-Natta, metallocene, or single-site catalysis, added via compounding such as but not limited to a twin screw extrusion process. It is desirable to use a PP-based polymer that has a melt flow rate of 0.8 to 8, preferably 2 to 4, more preferably 2 to 3. It is also desirable use a PP-based polymer that has 55 to 70%, preferably 55 to 65% crystallinity.

PP can be ultra-violet (UV) stabilized, and desirably can also be impact modified. Particularly desirable PP is stabilized with organic stabilizers. The PP can be free of titanium dioxide pigment to achieve UV stabilization thereby allowing use of less pigments to achieve any of a full spectrum of colors. A combination of low molecular weight and high molecular weight hindered amine-type light stabilizers (HALS) are desirable additives to impart UV stabilization to PP. Suitable examples of commercially available stabilizers include IRGASTAB™ FS 811, IRGASTAB™ FS 812 (IRGASTAB is a trademark of Ciba Specialty Chemicals Corporation). A particularly desirable stabilizer system contains a combination of IRGASTAB™ FS 301, TINUVIN™ 123 and CHIMASSORB™ 119. (TINUVIN and CHIMASSORB are trademarks of Ciba Specialty Chemicals Corporation).

The oriented polymer composition further comprises an inert inorganic filler. Inorganic materials do not suffer from all of the handicaps of organic fillers. Organic fillers include cellulosic materials such as wood fiber, wood powder and wood flour and are susceptible even within a polymer composition to color bleaching when exposed to the sun, and to decomposition, mold and mildew when exposed to humidity. However, inorganic fillers are generally denser than organic fillers. For example, inert inorganic fillers for use in the present invention typically have a density of at least two grams per cubic centimeter. Therefore, polymer compositions comprising inorganic fillers must contain more void volume than a polymer composition comprising the same volume of organic fillers in order to reach the same polymer composition density. Surprisingly, sufficient cavitation can occur during die drawing to achieve an oriented polymer composition having a density of less than 0.8 grams per cubic centimeter even when the polymer composition contains 30 wt % or more inorganic filler.

Inorganic fillers are either reactive or inert. Reactive fillers, such as Portland cement and gypsum, undergo a chemical reaction in the presence of water. Inert fillers do not undergo such a chemical reaction in the presence of water. Inert fillers are more desirable than reactive fillers in order to achieve a stable polymer composition density because the reactive fillers attract and react with water, causing changes in polymer composition density. Suitable inert inorganic fillers include talc, clay (for example, kaolin), magnesium hydroxides, aluminum hydroxides, dolomite, glass beads, silica, mica, metal fillers, feldspar, Wollastonite, glass fibers, metal fibers, boron fibers, carbon black, nano-fillers, calcium carbonate, and fly ash. Particularly desirable inert inorganic fillers include talc, calcium carbonate, clay and fly ash. The inorganic filler can be one or a combination of more than one inorganic filler. More particularly, an inert inorganic filler can be any one inert inorganic filler or any combination of more than one inert inorganic filler.

An objective of the present invention is to achieve void volume in a polymer composition containing inert inorganic filler primarily if not exclusively through cavitation rather than by means of a foaming agent. Cavitation is a process by which void volume forms proximate to filler particles during a drawing process as polymer is drawn away from the filler particle. Cavitation is a means of introducing void volume into an oriented polymer composition without having to use a blowing agent. The oriented polymer composition of the present invention contains less than three wt %, preferably less than two wt %, more preferably less than one wt %, still more preferably less than 0.5 wt % blowing agent and can be free of blowing agent. Herein, "blowing agent" includes chemical blowing agents and decomposition products therefrom. Measure wt % blowing agent relative to total oriented polymer composition weight.

Generally, the extent of cavitation (that is, amount of void volume introduced due to cavitation) is directly proportional to filler concentration. Increasing the concentration of inorganic filler increases the density of a polymer composition, but also tends to increase the amount of void volume resulting from cavitation. Particularly desirable embodiments of the present oriented polymer composition has 30 volume-percent (vol %) or more, preferably 40 vol % or more, more preferably 50 vol % or more void volume based on total polymer composition volume. Most desirably, the void volume is due primarily if not exclusively due to cavitation. An absence of blowing agent indicates void volume is due to cavitation.

Typically, oriented polymer composition of the present invention contains 30 wt % or more, preferably 40 wt % or more, and more preferably 45 wt % or more filler. Filler can be present in an amount of 60 wt % or more, even 70 wt % or more. Generally, the amount of filler is 95 wt % or less in order to achieve structural integrity. Determine wt % of filler based on total oriented polymer composition weight.

The oriented polymer composition of the present invention has a density of less than 0.8 g/cm$^3$, preferably 0.75 g/cm$^3$ or less, more preferably 0.7 g/cm$^3$ or less. Measure oriented polymer composition density according to American Society for Testing and Materials (ASTM) method 792-00. A density of less than 0.8 g/cm$^3$ is desirable to achieve a density similar to or less than that of wood materials, which are commonly used in markets for which the oriented polymer composition of the present invention is useful. Having a density similar to or less than that of wood is desirable to achieve ease of handling during shipping and use. In that regard, a lower density composition is more desirable than a higher density composition provided that the lower density composition has sufficient stiffness.

One of the surprising discoveries of the present invention is that sufficient cavitation can occur using inert inorganic filler to achieve an oriented polymer composition having a density of less than 0.8 g/cm$^3$ despite having a relatively high concentration of the high density inert inorganic filler while also having a linear draw ratio of ten or less, even eight or less, even five or less when using a die drawing process. Increasing linear draw ratio results in more highly oriented polymer compositions in the drawing dimension and greater cavitation (hence, increased void volume). However, increasing linear draw ratio also decreases structural integrity in an oriented article, manifest by a decrease in delamination force in the drawing dimension. Fibrillation of the oriented composition into strands extending in the draw direction (drawing dimension) can occur when orientation becomes extreme and delamination force too low. The present invention provides oriented polymer compositions that enjoy a benefit from high cavitation void volumes without suffering from the handicap of low delamination strength due to linear draw ratios of eleven or more. Filled oriented polymer compositions of the present invention have delamination force values of greater than 44.5 Newtons (N) (ten pounds force). The delamination for is desirably 50 N (11.2 pounds force) or greater, preferably 75 N (16.8 pounds force) or greater, more preferably 100 N (22.5 pounds force) or greater and still more preferably 150 N (33.7 pounds force) or greater.

Stiffness of a polymer composition is also important for meeting building codes for certain end uses for oriented polymer compositions of the present invention. Measure stiffness as flexural modulus (modulus of elasticity) in accordance to ASTM method D-790-03. The oriented polymer compositions of the present invention, in combination with having a density of less than 0.8 g/cm$^3$, have a flexural modulus of 1.4 gigapascals (GPa) (200,000 pounds per square inch (psi)) or greater, preferably 2.1 GPa (300,000 psi) or greater, more preferably 2.8 GPa (400,000 psi) or greater. A flexural modulus of 1.4 GPa or more is desirable to meet deck board code requirements requiring a board stiffness sufficient that the board demonstrates less than 0.09 inches deflection with 100 pounds per square foot weight evenly distributed over a 16 inch span. (see, for example, *International Code Council-Evaluation Services (ICC-ES) requirement AC174 entitled: Acceptance Criteria for Deck Board Ratings and Guardrail Systems*). Increasing flexural modulus is desirable to achieve even greater board stiffness in order to safely support further weight than the code requires.

All cross section dimensions of the oriented polymer compositions of the present invention are greater than 1.5 millimeters (mm), and are typically 3 mm or greater, more typically 5 mm or greater. Such polymer compositions have relatively large cross sectional areas which distinguish them from films and fibers. Drawing a polymer composition with relatively large cross section dimension (that is, large cross section area) has challenges that film drawing process do not have due to processing window differences. For instance, film drawing can occur at much lower temperatures than large cross section articles. Draw stresses necessary for drawing films are much lower than for large cross section articles. As a result, a drawing process is more likely to exceed the break stress for larger cross section articles than for films.

Moreover, achieving sufficient draw stress to induce enough cavitation to achieve a density of less than 0.8 g/cm$^3$ is more challenging as the cross section dimensions of the polymer composition increase. Nonetheless, the process of the present invention (described below) overcomes each of these challenges with polymer compositions that exceed the dimensions of a film in order to produce the oriented polymer composition of the present invention.

Oriented polymer compositions of the present invention desirably have a low degree of connectivity between void spaces that result from cavitation. Connectivity provides fluid communication between void spaces and can facilitate fluid (for example, moisture) build up within the composition. That, in turn, can cause an undesirable increase in oriented polymer composition density, or fluctuations in density depending on the humidity. Desirably, less than 75%, preferably less than 50%, more preferably less than 25%, even more preferably less than 10% of the void volume due to cavitation is accessible by water. Most desirably, less than 5%, even less than 1% of the void volume is accessible by water. Measure water accessibility by immersing a polymer composition in water and recording its change in density with time. Water uptake into the void spaces (indicating interconnectivity) is evident by an increase in density after immersion in water. In a particularly desirable embodiment, the same accessibility values apply after placing the oriented polymer composition in a pressure cooker.

Oriented polymer composition of the present invention can have any conceivable cross sectional shape including circular or non-circular ellipse, oval, triangle, square, rectangle, pentagon, hexagon, keyhole, arched doorway, or any other profile useful as wood trim or as decking components (for example, railings, boards, spindles).

Solid State Drawing Process

A second aspect of the present invention is a solid state drawing process for producing the oriented polymer composition of the first aspect. A solid state drawing process involves pulling (that is, drawing) a polymer composition comprising an orientable polymer with sufficient force so as to induce alignment of polymer molecules in the polymer composition. Aligning polymer molecules (that is, polymer orientation or "orientation") is desirable to enhance the strength and modulus (stiffness) of a polymer composition. The drawing process can also induce cavitation in a filled polymer composition, thereby reducing the polymer composition's density.

The solid state drawing process of the present invention involves drawing a polymer composition containing an inert inorganic filler and a continuous phase of one or more orientable polymer. The polymer composition is the same as that described above for the oriented polymer composition. Orientation and cavitation of the polymer compound occurs while drawing the polymer composition in the present process.

Condition the polymer composition comprising the inert inorganic filler and orientable polymer to a drawing temperature ($T_d$) prior to drawing.

The drawing temperature is more than ten degrees Celsius (° C.) below the $T_s$ of the polymer composition. The drawing temperature can be fifteen ° C. or more, twenty ° C. or more, thirty ° C. or more, even forty ° C. or more below the polymer composition $T_s$. Cavitation will not occur to any significant extent if the drawing temperature is above the orientable polymer composition's $T_s$. The present process requires drawing at a temperature of more than ten ° C. below $T_s$ in order to achieve sufficient cavitation to reach a final density of 0.8 gram per cubic centimeter (g/cm$^3$) for the oriented polymer composition.

Generally, the drawing temperature is forty ° C. or less below the polymer composition's $T_S$. Drawing a polymer composition at a draw temperature more than forty ° C. below its $T_s$ requires slower draw rates than is economically desirable in order to avoid fracturing.

Desirably, 50 weight-percent (wt %) or more, more desirably 90 wt % or more of the polymers in a polymer composition have a $T_m$. More desirably, all of the polymers in the polymer composition have a $T_m$.

The present process is a die drawing process. That means drawing occurs through a solid state drawing die at the drawing temperature. A die drawing process is in contrast to a free draw process. In a free draw process a polymer composition necks apart from any physical constraint. Free drawing offers little control over the final polymer composition size and shape after drawing other than by controlling the polymer composition shape prior to drawing. Typically, a free drawn polymer composition has a cross sectional shape proportional to its cross sectional shape prior to drawing. The present process utilizes a drawing die in order to achieve better control and to enable drawing to a different cross sectional shape in the polymer composition after drawing as compared to prior to drawing. The die drawing process may be either batch (for example, drawing discrete polymer billets) or continuous (for example, drawing a continuous feed of polymer composition from an extruder).

A drawing die provides a physical constraint that helps to define a polymer composition's size and shape by directing polymer movement during the drawing process. Die drawing occurs by conditioning a polymer composition to a drawing temperature and then pulling a polymer composition through a shaping channel in a drawing die. The shaping channel constricts the polymer composition in at least one dimension causing the polymer composition to draw to a general cross sectional shape. Die drawing processes advantageously provide greater control in shaping a polymer composition during a drawing process than is available in a free draw process.

The present process is not limited to a specific drawing die. However, the present invention advantageously employs a substantially proportional drawing die. A substantially proportional drawing die directs drawing of a polymer composition in such a manner so as to achieve an oriented polymer composition having a cross sectional shape proportional to that of the polymer composition entering the proportional drawing die. Such a die balances polymer forces directed towards a polymer cross section centroid such that variations in polymer composition or processing conditions do not affect the shape of the final oriented polymer composition. Therefore, such a drawing die advantageously provides predictable control over the final polymer composition shape despite changes in polymer composition or drawing process conditions.

Draw the polymer composition through a drawing die at a specific draw rate. The draw rate is instrumental in determining the density and modulus of a resulting oriented polymer composition. Faster draw rates can advantageously induce more cavitation (therefore, produce a lower density product) generate a greater extent of orientation (higher modulus) and generally provide a more economically efficient process. Draw rate is a linear rate that polymer composition exits a drawing die in a drawing direction.

Part of the present surprising discovery is that to achieve a density of less than 0.8 g/cm$^3$ by means of cavitation and a modulus of 1.4 GPa (200,000 psi) the process must use a draw rate of 0.25 meter per minute (m/min) or faster, Desirably, the draw rate is 0.5 m/min or faster, preferably one m/min or faster, and more preferably two m/min or faster. An upper limit for the draw rate is limited primarily by the drawing force necessary to achieve a specific draw rate. The drawing force should be less than the tensile strength of the polymer composition at the drawing temperature in order to avoid fracturing the polymer composition. Typically, the draw rate is 30.5 meters per minute or slower, more typically nine meters per minute or slower.

Another part of the present discovery is that sufficient cavitation to provide a polymer composition with a density of less than 0.8 g/cm$^3$ and a flexural modulus of 1.4 GPa or greater is possible using a linear draw ratio of ten or less, even eight or less, even five or less. WO2004/009334 discloses oriented polymer compositions containing reactive inorganic fillers and their examples illustrate oriented polymer composition having a density less than 0.8 g/cm$^3$ only when using a free draw process implementing a linear draw ratio of greater than 11. A sample with such a high linear draw ratio will have an undesirably low delamination force (see, for example, Comparative Examples M-P bellow).

The present invention ideally utilizes a nominal draw ratio of 1.25 or more and can employ a nominal draw ratio of 1.5 or more, two or more, three or more, four or more, five or more, even six or more. Higher nominal draw ratios are desirable to achieve higher polymer orientation. Increasing polymer orientation increases polymer composition strength and stiffness. However, increasing nominal draw ratio also increases linear draw ratio. Therefore, it is desirable to use a nominal draw ratio that is 8 or less, preferably 6 or less, more preferably 5 or less, even more preferably 4 or less in order to maximize the structural integrity of the oriented polymer composition. The nominal draw ratio can be 3 or less, even 2 or less.

EXAMPLES

The following examples serve to further illustrate embodiments of the present invention.

Preparation of Polymer Compositions

TABLE 1

Initial Polymer Compositions

| Composition | Polymer Composition $T_s$ (°C.) | Polymer | Filler |
|---|---|---|---|
| (a) | 163 | Nucleated polypropylene-ethylene random copolymer having 0.5 wt % ethylene component and a melt flow rate of 3 (for example., INSPIRE ™ D404.01, INSPIRE is a trademark of The Dow Chemical Company) | 46 wt % Talc composition based on total composition weight. Talc composition is 50-60 wt % talc and 40-50 wt % magnesium carbonates having a median diameter of 16.4 microns. (for example, TC-100 from Luzenac) |
| (b) | 163 | [same as (a)] | 46 wt % Calcium carbonate having a mean particle size of 1.1 microns, with wt % based on total composition weight (for example, Supercoat from Imersys) |
| (c) | 148 | Polypropylene-ethylene random copolymer having 3.2 wt % ethylene and a melt flow rate of 1.9 (for example, 6D83K from The Dow Chemical Company). | 46 wt % fly ash as received from Headwaters Resources (for example, Class F from Headwaters Resources) |
| (d) | 148 | [same as (c)] | [same as (a)] |
| (e) | 160 | Polypropylene homopolymer with a melt flow rate of 2.8 (for example, 5D37 from The Dow Chemical Company). | [same as (a)] |
| (f) | 163 | [same as (a)] | 50 wt % Portland Cement |
| (g) | 163 | [same as (a)] | 40 wt % Portland Cement |

Prepare polymer compositions "a" through "g" (described in Table 1) by the following procedure: compound the polymer and filler using a suitable mixing extruder, for example a Farrell Continuous Mixer (FCM) or co-rotating twin screw extruder. Feed polymer and filler at the specified weight ratio through standard loss in weight feeders. Melt the polymer in the mixing extruder and mix the filler into the polymer matrix to form a polymer/filler mix. Feed the polymer/filler mix from the mixing extruder into a suitable pumping device (for example, a single screw extruder or gear pump) and then through a multi-hole strand die to produce multiple strands of the polymer/filler mix. Cool the strands under water and cut them into pellets.

For Compositions (a)-(e), re-extrude the pellets into a polymer composition billet. Alternatively the polymer/filler mix may be pumped directly from the pumping device through a profile die and then cooled to produce a polymer composition billet without forming pellets and re-extruding. As yet another alternative, the polymer/filler mix may be pumped directly from the pumping device, through a profile die, cooled to a drawing temperature and then drawn to an oriented polymer composition.

For Compositions (f) and (g), injection mold the composition into a ASTM D-790 type 1 tensile bar for use in Comparative Examples (Comp Exs) M-P.

Drawing Procedure

Examples (Exs)

Smaller Scale Compositions

Mill a billet of polymer composition corresponding to the desired example to have cross section dimensions to match the nominal draw ratio for a specific example. Table 2 provides the dimensions of the billets for the corresponding nominal draw ratios. Mill an initial tab on an end of each billet that is smaller in dimension than any point in the shaping channel and longer than the length of the die. The tab extends through the die for attaching an actuator to pull the rest of the billet through the die.

TABLE 2

Milled Billet Dimensions

| Nominal Draw Ratio | Milled Billet Width cm (in) | Milled Billet Height cm (in) |
|---|---|---|
| 2 | 1.80 (0.707) | 0.450 (0.177) |
| 4 | 2.54 (1.0) | 0.635 (0.25) |

Draw Exs 1(a)-1(f) using a proportional die with a die exit opening of 1.27 cm (0.5")×0.3175 cm (0.125") and a rectangular shaping channel having cross section dimensions substantially proportional to one another. The walls spanning the height of the channel converge at 15° angle to reduce the width while the walls spanning the width dimension converge at a 3.83° angle to reduce the height. This die is described and illustrated further in a U.S. patent application having Ser. No. 60/858,122 and entitled SUBSTANTIALLY PROPORTIONAL DRAWING DIE FOR POLYMER COMPOSITIONS (see, Proportional Die description in the Examples, incorporated herein by reference). The die channel opening has a cross section that is larger and proportional to the cross section of the billet entering the die channel, as well as the die exit opening.

Condition each billet to a drawing temperature prior to drawing through the drawing die. Draw a billet through the drawing die by extending the initial tab through the drawing die, gripping the tab with an actuator and then pulling the billet through the drawing die using an MTS hydraulic tester, model number 205. Center the billet in the shaping channel of the die. Draw the billet slowly at first to orient the leading edge and then bring to a specific draw rate while maintaining the die at the drawing temperature. The drawn polymer composition represents the Example or Comparative Example.

Each of Comparative Examples A-I and Examples 1(a)-1(f) has a rectangular cross section with a width of 9-10 mm and a height of 2.1-2.6 mm and has less than 5% of the void volume in each accessible by water in a water immersion test.

TABLE 3

| Ex | Polymer Comp. | Draw Temp. °C. below polymer composition $T_s$ | NDR[1] | Draw Rate cm/min | LDR[2] | Oriented Density g/cm³ | Flex Modulus GPa | Delamination Force N (lb force) |
|---|---|---|---|---|---|---|---|---|
| Comp Ex A | a | 10 | 4 | 2.54 | 5.7 | 1.09 | 4.6 | NM* |
| Comp Ex B | a | 10 | 4 | 25.4 | 7.3 | 0.95 | 4.2 | NM* |
| Comp Ex C | a | 10 | 4 | 127 | 9.9 | 0.82 | 3.9 | NM* |
| Comp Ex D | a | 10 | 4 | 254 | 10.1 | 0.84 | 3.7 | NM* |
| Comp Ex E | a | 10 | 4 | 508 | 9.7 | 0.85 | 3.6 | NM* |
| Comp Ex F | a | 20 | 4 | 2.54 | 7.2 | 0.89 | 4.2 | 49.4 (11.1) |
| Comp Ex G | a | 20 | 4 | 25.4 | 9.7 | 0.82 | 4.9 | 54.3 (12.2) |
| 1(a) | a | 20 | 4 | 50.8 | 10.3 | 0.79 | 5.0 | 51.6 (11.6) |
| 1(b) | a | 20 | 4 | 101 | 11.6 | 0.75 | 5.5 | 99.6 (22.4) |
| 1(c) | a | 20 | 4 | 127 | 12.8 | 0.73 | 5.3 | 70.3 (15.8) |
| Comp Ex H | a | 30 | 4 | 2.54 | 6.7 | 0.93 | 4.0 | 187 (42) |
| 1(d) | a | 30 | 4 | 25.4 | 9.7 | 0.75 | 4.5 | 84.5 (19) |
| Comp Ex I | a | 30 | 4 | 127 | 13.6 | 0.65 | 6.6 | 28 (6.3)[3] |
| 1(e) | a | 30 | 4 | 254 | 14.4 | 0.68 | NM* | 82.7 (18.6) |
| 1(f) | a | 30 | 4 | 508 | 13.7 | 0.69 | NM* | 73.4 (16.5) |

*"NM" means "not measured"
[1]NDR is "nominal draw ratio"
[2]LDR is "linear draw ratio"
[3]It is expected that this low delamination value is an outlier, perhaps due to unobserved void(s) in the center of the sample. The trend in samples 1(d)-1(e) suggests this value should be between 84.5 and 82.7 Newtons. As measured, however, this delamination value is outside our claimed range and so the example is listed as a Comparative Example.

Comparative Examples A-H and Examples 1(a)-1(f) illustrate the effect of drawing temperature on oriented polymer composition density for a polymer composition similar to composition "a". Examples 1(a)-(f) are free of blowing agent.

Examples (Exs) 2-7

Larger Scale Compositions

Mill a billet of polymer composition corresponding to the desired example to have cross section dimensions to match a nominal draw ratio for a specific example. Table 4 provides the dimensions of the billets for the corresponding nominal draw ratios. Mill an initial tab on an end of each billet that is smaller in dimension than any point in the shaping channel and longer than the length of the die. The tab extends through the die for attaching an actuator to pull the rest of the billet through the die.

TABLE 4

| | Milled Billet Dimensions | |
|---|---|---|
| Nominal Draw Ratio | Milled Billet Width cm (in) | Milled Billet Height cm (in) |
| 1.8 | 6.81 (2.68) | 3.40 (1.34) |
| 4 | 10.16 (4.0) | 5.08 (2.0) |

Condition each billet to the desired temperature prior to drawing through the drawing die. Draw a billet through a drawing die by extending the initial tab through the drawing die; gripping the tab with an actuator and then pulling the billet through the drawing die. Center the billet in the shaping channel of each die. Draw the billet slowly at first to orient the leading edge and then bring to a specific draw rate. Draw the billet through a proportional die.

The drawing die used is a proportional die proportional similar to that used in Example 1. The proportional die for Examples 2-7 has a die exit opening of 5.08 cm (2")×2.54 cm (1") and a rectangular shaping channel having cross section dimensions substantially proportional to one another. The walls spanning the height of the channel converge at 15° angle towards a plane centrally located between them in order to reduce the width of the die channel while progressing towards the channel's exit opening. The walls spanning the width dimension converge at a 3.83° angle towards a plane centrally located between them in order to reduce the height of the die channel while progressing towards the cannel's exit opening. The die channel entrance opening has a cross section that is larger and proportional to both the cross section of the billet entering the die channel and the die exit opening. At the die exit was a land with length of 1.27 cm (0.5").

TABLE 5

Conditions and Results for Exs 2-7

| Ex | Polymer Comp. | Draw Temp. (° C. below polymer composition $T_s$) | NDR | Draw Rate (m/min) | LDR | Oriented Density (g/cm³) | Flex Modulus (GPa) | Delamination Force N (lb force) |
|---|---|---|---|---|---|---|---|---|
| 2 | a | 20 | 2 | 2.4 | 9.5 | 0.65 | 2.8 | 75.2 (16.9) |
| 3 | a | 15 | 2 | 2.4 | 8.5 | 0.80 | 3.0 | 127 (28.5) |
| 4 | a | 18 | 4 | 2.4 | 10.5 | 0.78 | 3.3 | 158 (35.5) |
| 5 | a | 18 | 2 | 2.4 | 9 | 0.80 | 2.8 | 122 (27.4) |
| 6 | e | 23 | 2 | 2.4 | 10 | 0.73 | 2.4 | 89 (20) |
| 7 | e | 18 | 2 | 2.4 | 8.5 | 0.80 | 3.0 | 110 (24.7) |

Each of Exs 2-7 had a width between 29 and 36 mm and a height between 14 and 18 mm. Each of Exs 2-7 has less than 5% of the void volume accessible by water.

Exs 2-7 illustrate large scale oriented polymer compositions of the present invention prepared with various polymer compositions, drawing temperatures and linear draw ratios. Exs 2-7 are free of blowing agent and have less than 5% of their void volume accessible by water in an immersion test.

Comp. Ex. M-P

Free Drawn Sample with Portland Cement

Free draw the tensile bars of compositions (f) and (g) according to the parameters in Table 6. Mark three lines on the gauge area of the tensile bars. Space each line 2.54 centimeters (one inch) apart from its neighboring line(s) perpendicular to the drawing direction. Draw the tensile bars in an oven after allowing the tensile bars to equilibrate to the specified drawing temperature. Grip one end of the tensile bar with a stationary (anchoring) self tightening grip. Grip an opposing end of the tensile bar with a mobile self-tightening grip. Using a caterpillar type puller draw the tensile bar by pulling the mobile self-tightening grip affixed to the tensile bar at a rate of 2.4 meters (eight feet) per minute to draw the tensile bar 0.6-0.9 meters (two-three feet).

Determine linear draw ratio by measuring the distance between marked lines on the tensile bars after drawing and dividing that by the 2.54 centimeter (one inch) spacing from prior to drawing. The linear draw ratio is the average ratio determined for the two line spacings.

Measure density, flexural modulus and delamination force in the same manner as the other examples. Note, because these comparative examples are free drawn, there is no drawing die so the drawing process effectively has a nominal draw ratio of one.

TABLE 6

| Comp. Ex. | Polymer Comp. | Draw Temp. (° C. below polymer composition $T_s$) | LDR | Density (g/cm³) | Flex Modulus (GPa) | Delamination Force N (lb force) |
|---|---|---|---|---|---|---|
| M | f | 5 | 9 | 0.68 | | 21.4 (4.8) |
| N | f | 5 | 9 | 0.74 | | 20.9 (4.7) |
| O | f | 10 | 8.5 | 0.66 | | 36.9 (8.3) |
| P | g | 10 | 7.25 | 0.78 | | 24.0 (5.4) |

Comparative Examples M-P illustrate that free drawn samples containing 40-50 wt % Portland cement suffer from a Delamination Force that is less than 44.5 Newtons (10 pounds force). Attempts at free drawing comparative examples of these polymer compositions at LDR values greater than 9 were unsuccessful because the tensile bars would break.

Based on data presently being collected and compiled, it is expected that increasing the linear draw ratio on a filled polymer composition will reduce the Delamination Force of the resulting oriented polymer composition. Furthermore, it is expected that increasing the amount of Portland cement to levels above 50 wt % (for example, 60 wt %) of the polymer composition will retain or reduce the Delamination Force relative to compositions with 40-50 wt % Portland cement that are free drawn at the same drawing temperature and LDR.

What is claimed is:

1. A process for solid state drawing a polymer composition to produce an oriented polymer composition article, the process comprising the steps:
   (a) providing a polymer composition comprising thirty weight-percent or more and 95 weight-percent or less of an inert inorganic filler based on polymer composition weight and a continuous phase of at least one orientable polymer, the polymer composition having a melt temperature;
   (b) conditioning the temperature of the polymer composition to a drawing temperature that is fifteen degrees Celsius or more and forty degrees Celsius or less below the polymer composition's softening temperature; and
   (c) drawing the polymer composition though a drawing die at a drawing rate of at least 0.25 meters per minute and with a nominal draw ratio of 1.25 or more and 8 or less to produce a drawn polymer composition article that comprises less than three weight-percent blowing agent based on polymer composition article weight, and has a density of less than 0.8 grams per cubic centimeter, a flexural modulus of 1.4 gigapascals or more, cross sectional dimensions all greater than 1.5 millimeters, a delamination force value greater than 44.5 Newtons and void volume proximate to the inorganic filler.

2. The process of claim 1, wherein drawing in step (c) achieves a linear draw ratio of 10 or less.

3. The process of claim 1, wherein the orientable polymer is one or more than one semi-crystalline polymer.

4. The process of claim 1, wherein the orientable polymer is selected from the group consisting of polypropylene-based polymers, polyethylene-based polymers, polyvinyl chloride and polyester-based polymers.

5. The process of claim 1, wherein the draw rate is 0.5 meters per minute or faster.

6. The process of claim 1, wherein the draw rate is one meter per minute or faster.

7. The process of claim 1, wherein the drawing temperature is at least twenty degrees Celsius below the polymer composition's softening temperature.

8. The process of claim 1, wherein the filler is selected from the group consisting of talc, clay, calcium carbonate and fly ash.

9. The process of claim 1, wherein the filler is present at a concentration of 40 percent by weight or more relative to polymer composition weight before drawing.

10. The process of claim 1, wherein the polymer composition experiences a nominal draw ratio of 1.25 or more and less than five.

11. The process of claim 1, wherein drawing is done through a drawing die that induces proportional drawing of the polymer composition.

12. The process of claim 1, wherein the polymer composition is free of blowing agent.

13. The process of claim 1, further comprising cooling the polymer composition after it exits the drawing die.

* * * * *